(12) United States Patent
Clifford

(10) Patent No.: US 8,933,812 B2
(45) Date of Patent: Jan. 13, 2015

(54) VERMIN TRAP SIGNALING DEVICE

(71) Applicant: William B Clifford, Ada, MI (US)

(72) Inventor: William B Clifford, Ada, MI (US)

(*) Notice: Subject to any disclaimer, the term of this patent is extended or adjusted under 35 U.S.C. 154(b) by 22 days.

(21) Appl. No.: 13/768,863

(22) Filed: Feb. 15, 2013

(65) Prior Publication Data

US 2013/0222146 A1 Aug. 29, 2013

Related U.S. Application Data

(60) Provisional application No. 61/603,610, filed on Feb. 27, 2012.

(51) Int. Cl.
| | |
|---|---|
| *G08B 21/00* | (2006.01) |
| *G08B 21/18* | (2006.01) |
| *A01M 31/00* | (2006.01) |

(52) U.S. Cl.
CPC ............. *G08B 21/18* (2013.01); *A01M 31/002* (2013.01)
USPC ................... 340/686.1; 340/692; 340/384.2; 340/384.6; 43/58; 43/61; 43/77; 43/81

(58) Field of Classification Search
CPC .............................. G08B 21/18; A01M 31/002
USPC ............ 340/686.1, 692, 384.2, 384.6; 43/58, 43/61, 77, 81
See application file for complete search history.

(56) References Cited

U.S. PATENT DOCUMENTS

| | | | |
|---|---|---|---|
| 5,154,017 A | 10/1992 | Disalvo | |
| 5,184,416 A | 2/1993 | Brewer | |
| 5,477,635 A | 12/1995 | Orsano | |
| 6,137,415 A | 10/2000 | Rast | |
| 6,282,832 B1 * | 9/2001 | Manno | 43/81 |
| 6,655,077 B1 * | 12/2003 | Trevino | 43/81 |
| 6,807,767 B1 | 10/2004 | Schade | |
| 7,026,942 B2 | 4/2006 | Cristofori et al. | |
| 2009/0151221 A1 | 6/2009 | Daley | |
| 2011/0083358 A1 | 4/2011 | Slotnick | |

* cited by examiner

*Primary Examiner* — Tai T Nguyen
(74) *Attorney, Agent, or Firm* — Waters & Oppenhuizen PLC; David L. Oppenhuizen

(57) ABSTRACT

A signaling device that indicates actuation of a remotely located mousetrap comprises a base that supports the trap, a power supply, and a mounted electrical interface switch. The switch is held open by a non-conductive interrupter positioned between the switch contacts and connected to the bail of the trap. The bail dislodges the interrupter and closes its switch when the trap is actuated, producing a visual flashing light at the users location. The signaling device can be tested by a test actuator switch located at the users location. A tether clips the signaling device to the trap.

20 Claims, 4 Drawing Sheets

_(1)_
VERMIN TRAP SIGNALING DEVICE

CROSS-REFERENCE TO RELATED APPLICATION

This application claims the benefit of U.S. Provisional Application No. 61/603,610, filed Feb. 27, 2012.

BACKGROUND OF THE INVENTION

Animal traps may optionally be combined with a signaling device to indicate when the trap has been "sprung" or "tripped" by an animal.

Mechanical means have been proposed to provide a visual indication when a vermin trap has been sprung. For details of an example technology, refer to patent U.S. Pat. No. 4,216,606. Unfortunately, this type of visual signal is useful only if the trap can be viewed directly, and provides no benefit when the trap is placed out of sight.

Electronic circuits to signal when a trap has been tripped have been proposed. For additional details, refer to patents U.S. Pat. No. 5,154,017, U.S. Pat. No. 6,807,767, U.S. Pat. No. 5,477,635, and U.S. Pat. No. 6,137,415. These proposals are disadvantaged by requiring impractical modifications of conventional traps, or the signal circuits are unreasonably expensive as they incorporate significant electronics. Additionally, these proposals do not provide a way to remotely verify the signaling mechanism is in good operational condition. This is inconvenient when the trap is deployed in a hidden spot because the trap must be removed from the hidden spot to be tested to ensure the battery has not run down.

The use of remote visual indication of a trap being tripped has been proposed, using both wired and wireless signaling. For additional details, refer to patents U.S. Pat. No. 5,184,416 and U.S. Pat. No. 7,026,942, and publications US 2009/0151221 and US 2011/0083358. The proposed remote visual indicators are expensive systems that are not economically reasonable for consumer use or industrial use, or they require impractical modifications of conventional traps. Additionally, these proposals do not provide a way to remotely verify the signaling mechanism is in good operational condition. This is inconvenient when the trap is deployed in a hidden spot because the trap must be removed from the hidden spot to be tested to ensure the battery has not run down.

What is needed is a way to visually signal when a trap has been sprung that can be perceived even when the trap is placed out of sight, and which is easily used with unmodified conventional traps. What is also needed is a device to provide a remote visual signal that a trap has been sprung, along with a way to remotely verify the device is in good operational condition.

SUMMARY OF THE INVENTION

One aspect of the present invention is the use of a non-conducting ratcheted fastener, such as a plastic zip tie, for fastening to the bail of a mousetrap to provide a mechanical interface between the trap and an electrical continuity switch.

Another aspect of the present invention is the placement of a battery check switch remotely from the mousetrap and the electrical power source using a cable of indefinite length.

Yet another aspect of the present invention is the placement of a signal light remotely from the mousetrap using a cable of indefinite length.

According to one embodiment of the present invention, a signaling device has a base adapted to support a vermin trap and a clip affixed to the base by a tether for clipping the vermin trap to the base. On the base is a trap interface switch that has opposed contacts biased toward one another in a normally closed configuration. A nonconductive interrupter securely attaches to the bail of the trap and is sized to fit between the opposed contacts to hold the trap interface switch in an electrically open position. An electrical power supply is attached to the base and is electrically connected in series with the trap interface switch and a visible beacon. The visible beacon has a LED and a periodic pulse generator circuit connected to the LED so as to periodically energize the LED to produce light pulses. A normally open test switch is electrically connected in parallel with the trap interface switch. A cable of substantial length provides series electrical connection of the visible beacon with the trap interface switch and the power supply, and provides parallel electrical connection of the test switch with the trap interface switch.

Visual signaling according to embodiments of the present invention is useful with a wide variety of traps, of various sizes and bail configurations.

Visual signaling according to embodiments of the present invention has the advantage of being easy to use by providing an easy way to dispose of the remains of any vermin caught in a trap.

Visual signaling according to embodiments of the present invention has the advantage of implementing remote access using an indefinitely long signal cable so that the trap can be hidden or placed in a difficult to access spot while the signal light is placed where it can be easily seen.

Visual signaling according to embodiments of the present invention provides reliable lighting of a signal lamp when the trap is sprung.

DETAILED DESCRIPTION OF THE INVENTION

Figure 1:
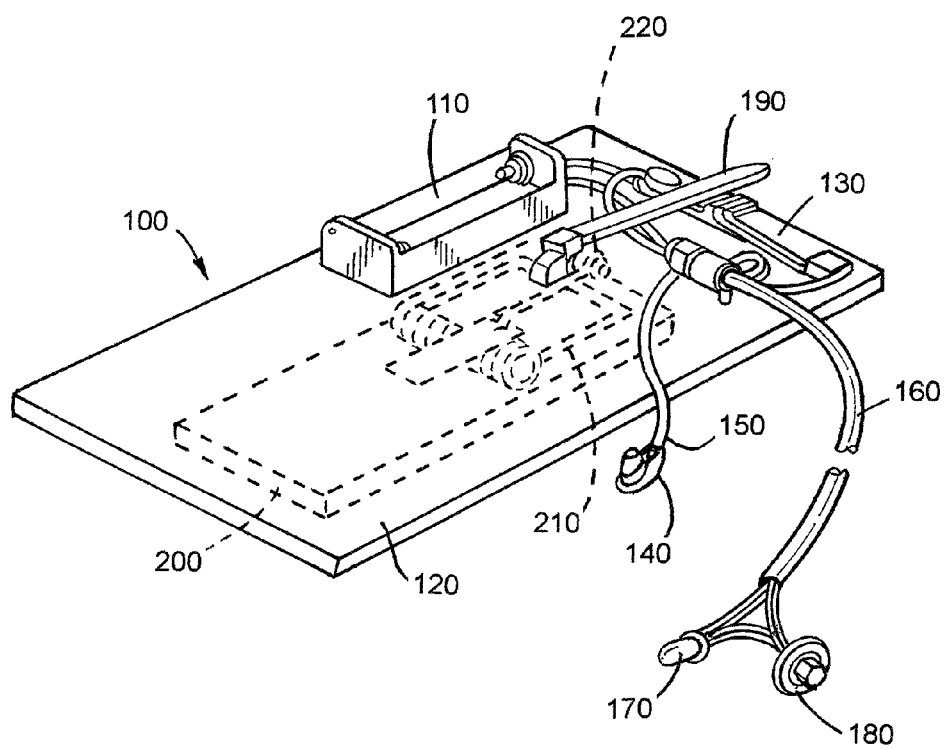
FIG. 1 provides a perspective view of a signaling device according to some embodiments of the present invention, with a conventional mousetrap (shown in phantom) atop the signaling device.

Referring to FIG. 1, a perspective view of a signaling device 100 according to at least one embodiment of the present invention is shown. A conventional mousetrap 200 (shown in phantom) is shown in relationship to the signaling device 100.

The signaling device 100 has a battery holder 110 and a trap interface switch 130 fastened to one side of a generally flat base 120. A clip 140 suitable for clipping onto a trap is disposed at the end of a tether 150 that is fastened to the base 120. The base 120 is sized to have sufficient mass to ensure inertial decoupling from the trap 200 when the trap is tripped. The base 120 may also be sized to provide a convenient space on which the trap 200 may sit.

A cable 160 is mechanically fastened near one of its ends to the base 120. The cable 160 provides electrical connection of the battery holder 110 and the trap interface switch 130 on the base 120 with a flashing LED 170 and a test switch 180 disposed at the other one of the cable's ends. A nonconductive interrupter 190 is fastened to the bail 210 of the trap 200 with a free end available to provide circuit interruption at the trap interface switch 130. See FIG. 4.

Figure 2:
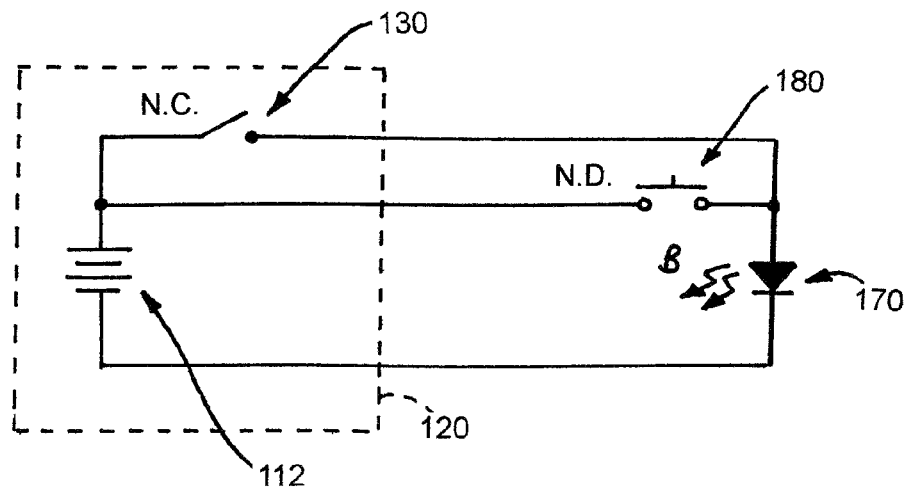
FIG. 2 provides an electrical schematic representative of some embodiments of the present invention.

With reference to FIG. 2, an electrical schematic diagram indicates electronic implementation of one embodiment of the present invention. A battery 112 provides electromotive potential for the circuit. The circuit is completed by closure of either of the parallel-connected trap interface switch 130 or test switch 180. The trap interface switch 130 is a spring biased normally closed (N.C.) electrical switch that has openly accessible contacts to provide for circuit interruption by placement of a nonconductive member between the contacts. See FIG. 4. The test switch 180 is a spring biased normally open (N.O.) electrical switch that closes upon press of a button.

Closure of either the trap interface switch 130 or the test switch 180 energizes the flashing LED 170 to provide a visual signal. The broken line rectangle indicates which components of the circuit are located at the base 120 (the battery 112 and the trap interface switch 130), in contrast to those that are located remotely (the test switch 180 and the flashing LED 170).

The flashing LED 170 is a commercially available component (e.g., at Radio Shack) that combines an LED, a flash timing circuit, and current limiting resistance in a single package. These combined functionalities may all be implemented in alternative formats, for example as described elsewhere in this disclosure.

Figure 4:
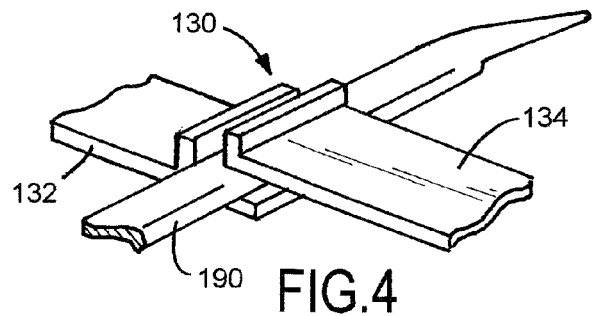
FIG. 4 provides a detail view of the mechanical interface of the signal switch and the nonconductive interrupter of the embodiment illustrated in FIG. 1.

With reference to FIG. 4, the mechanical interface of the signal switch 130 and the nonconductive interrupter 190 is shown as a detail view of the embodiment of FIG. 1. The trap interface switch 130 has a lower switch contact 132 and an upper switch contact 134 that are spring biased to contact one another in a normally closed mode of operation. A nonconductive interrupter 190 is interposed between the switch contacts 132, 134 to open the switch 130 and thereby interrupt the electrical path that the switch would otherwise complete. When the interrupter 190 is removed from between the switch contacts 132, 134, the switch 130 immediately closes.

Figures 4A, 5:
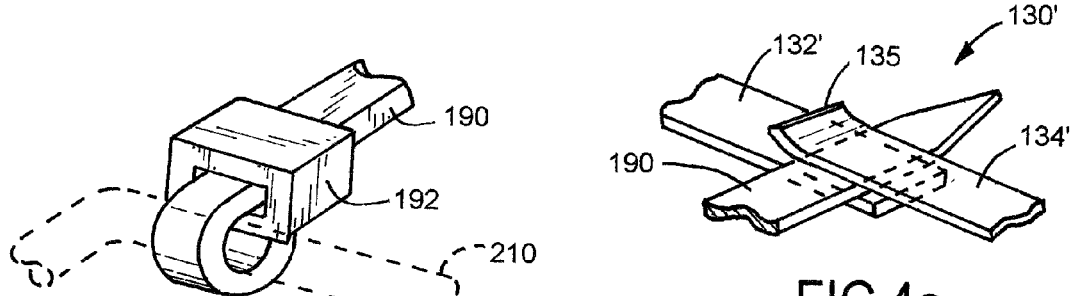
FIG. 4*a* provides a detail view of the mechanical interface of an alternative embodiment of the signal switch and the nonconductive interrupter.
FIG. 5 provides a detail view of the mechanical interface of a nonconductive interrupter, according to the embodiment illustrated in FIG. 1, with a conventional mousetrap (shown in phantom).

FIG. 4a discloses an alternative embodiment of the trap interface switch 130'. Upper and lower contacts 134' and 132' are flat conductive strips, with an outer end 135 of upper contact 134' being upturned to permit the strip 190 to be wedged between end 135 and the lower contact 132'.

FIG. 5 shows a detail view of the embodiment of FIG. 1 to provide a clear illustration of the mechanical interface of the interrupter 190 with the bail 210 (shown in phantom) of a conventional mousetrap. The interrupter 190 is electrically nonconductive and is securely fastened to the bail 210 so that when the bail 210 moves, the interrupter 190 is certain to move along with it. The interrupter 190 is shown as being an elongated member that is looped around the bail 210 and threaded through a ratcheted fastener 192 integrally disposed at one end of the interrupter. Commonly made from nylon or other flexible polymer resin, fastening devices like the interrupter 190 shown here, having an elongate body with an integral ratcheted fastener, are commercially available under the "cable tie" product name. Alternatively, other electrically nonconductive articles may be used for this purpose. For example, the interrupter 190 is alternatively embodied using plastic garbage bag ties.

Figure 6:
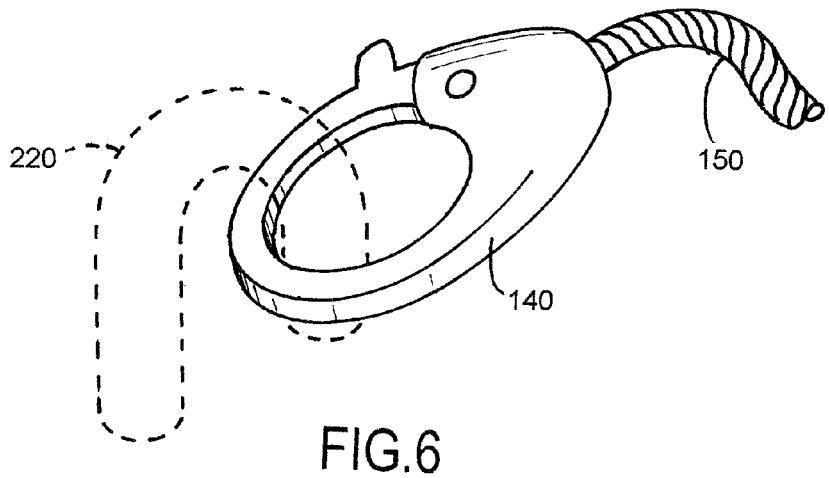
FIG. 6 provides a detail view of the mechanical interface of a spring clip, according to the embodiment illustrated in FIG. 1, with structure of a conventional mousetrap (shown in phantom).

Referring to FIG. 6, a detail view shows the mechanical interface of the spring clip 140, as shown in FIG. 1, with structure of a conventional mousetrap. The clip 140 is secured to one end of a tether 150, the other end of which is secured to the base 120 of the signaling device (see FIG. 1). An anchor 220, an element of the trap used to retain the bail in the armed position, is useful as an attachment point for the clip 140. By attaching the clip 140 to the trap 200, for example at the anchor 220, the trap is tethered to the signaling device 100. Tethering of the trap 200 to the signaling device 100 is intended to solve the problem of a wounded mouse escaping with the trap still attached. This will prevent the unfortunate scenario of the wounded mouse wandering off to die and decay in an unknown and difficult to find location. This feature is also useful for retrieval of the trap from its deployed location since one feature of the present invention is that it enables deployment of the trap in hard-to-see and hard-to-access locations.

Before arming the trap 200, the interrupter 190 is secured to the bail 210 and the clip 140 is attached to the trap at the anchor 220. The trap 200 is then baited and armed in the conventional way and the interrupter 190 is placed between the switch contacts 132, 134 of the switch 130. The trap 200 and signaling device 100 are deployed together into a location where vermin are likely to encounter the trap. The cable 160 is placed to extend from the deployed location so that users can easily observe the LED 170 without need for them to directly observe the trap itself.

When the trap 200 is sprung the bail 210 moves, which moves the interrupter 190 removing it from between the switch contacts 132, 134. Removal of the interrupter 190 from the switch 130 closes the switch and energizes the signaling circuit so that the LED 170 begins to flash. Without need to directly observe the trap, operation of the signal device 100 provides a user with information of when the trap has been sprung.

The cable 160 is a feature of the signal device 100 that enables the base 120 and the trap 200 to be deployed at location that is difficult or impossible to visually observe while providing an instantaneous visual indication of the trap's status at a location that is easy to observe.

A user's anxiety about the charge state of the battery 112 is relieved by operation of the battery test feature of the signal device 100. There is no need to retrieve the trap from its remotely deployed location to check the battery because actuation of the test switch 180 temporarily energizes the signal circuit long enough to see if there is sufficient battery power to cause the LED 170 to flash.

Figure 3:
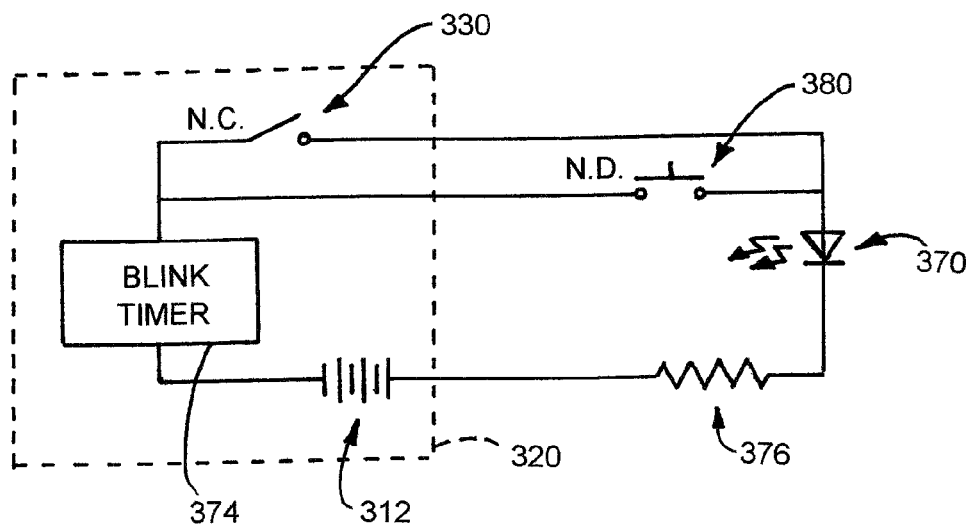
FIG. 3 provides an electrical schematic representative of an alternate embodiment of the present invention.

An electrical schematic diagram according to one embodiment of the present invention is shown in FIG. 3. A battery 312 provides electromotive potential for the circuit. The circuit is completed by closure of either of the parallel-connected trap interface switch 330 or test switch 380. The trap interface switch 330 is a spring biased normally closed (N.C.) switch analogous in structure and function to the interface switch 130 described above. The test switch 380 is a spring biased normally open (N.O.) switch analogous in structure and function to the test switch 180 described above.

Closure of either the trap interface switch 330 or the test switch 380 energizes a flashing timer 370, a flashing LED 374, and a current limiting resistor 376 to provide a visual signal. The flashing timer 370 provides a low duty cycle pulse (e.g., 20 ms pulse per 3 s cycle period) to drive the LED 374 and current limiting resistor 376 to provide a low current drain beacon signal. The flashing timer 370, flashing LED 374, and current limiting resistor 376 need not be arranged in series, nor in the particular order illustrated. Practice of this embodiment of the present invention can be accomplished so long as the components are related so that the LED 370 light source is current limited and biased on only intermittently so as to limit energy usage. As an example, the timer 370 may be readily implemented using an LM555 timer type circuit to provide a periodic beacon pulse as is well understood in the electronics art.

The broken line rectangle indicates which components of the circuit are located at the base 320 (the battery 312, the timer 374, and the trap interface switch 330), in contrast to those that are located remotely (the test switch 380 and the LED 370). Optionally, the current limiting resistor 376 may be disposed at either location, and in the illustrated embodiment is located remotely from the base 320.

Figure 7:
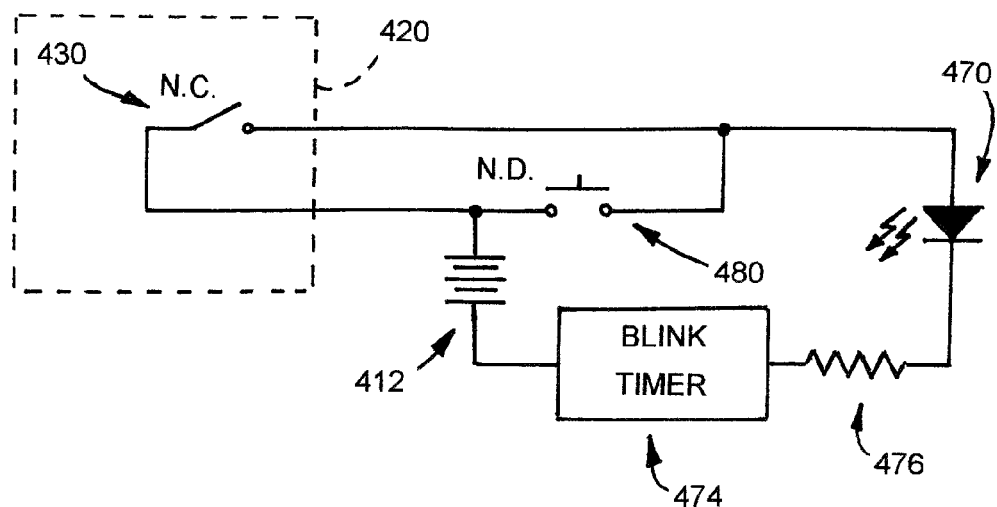
FIG. 7 provides an electrical schematic representative of another alternate embodiment of the present invention.

FIG. 7 provides an electrical schematic representative of another alternate embodiment of the present invention. According to this embodiment, the only circuit element disposed on the base 420 is the trap interface switch 430. The battery 412, blink timer 474, LED 470, current limiting resistor 476, and test switch 480 are all disposed remotely from the base 420 and electrically connected via a lengthy cable to the trap interface switch 430. Since the battery 412 is more readily accessible to the user, the test switch 480 may be optionally omitted with this embodiment.

Aside from the arrangement of the components, the circuit shown in FIG. 7 is electrically similar to and functionally the same as those shown in FIGS. 2 and 3. Factors to consider when deciding at which end of the long cable to place components are: ease of manufacture, overall manufacturing cost, form factor requirements of different size traps, and form factor requirements of intended deployment locations.

An advantage of the signal device embodiments described above is that the traps themselves may be treated as being disposable to avoid undue contact with the trapped animals. Limiting contact with vermin such as rats and mice is prudent since they do pose a health risk as disease vectors. Also disposable is the interrupter that is fastened to the bail of the trap. The interrupter is an inexpensive piece of plastic that need not be reused and may be disposed of along with the trap and the animal carcass.

A signal device has been described in this disclosure in various exemplary embodiments, but it will be understood by those having ordinary skill in this art that the disclosed invention is not limited by this description. Various modifications and variations of the described embodiments may be made without departing from the scope of this invention.

The invention claimed is:

1. A signaling device for use with a vermin trap having a movable bail that is spring biased toward a closed position, the device comprising:
   a base adapted to support the vermin trap;
   a trap interface switch affixed to the base, the trap interface switch having opposed contacts biased toward one another so that the trap interface switch is normally closed;
   a nonconductive interrupter adapted for secure attachment to the bail of the vermin trap, the interrupter being constructed and mounted such that the interrupter is positioned between the opposed contacts and holds the trap interface switch in an electrically open position when the bail is in an open position, the interrupter being further constructed and mounted such that actuation of the trap closes the bail and moves the interrupter away from its position between the contacts, allowing the contacts to close;
   a light source electrically connected to the trap interface switch; and
   an electrical power supply electrically connected to the light source through the trap interface switch such that the power supply actuates the light source when the trap interface switch closes as a result of the movement of the interrupter resulting from the closing of the bail, whereby the light source is illuminated when the trap is actuated.

2. The signaling device of claim 1 wherein the electrical power supply comprises a battery positioned in a battery holder.

3. The signaling device of claim 1 wherein the nonconductive interrupter comprises a cable tie, one portion of the tie being fastened to the bail for movement therewith, another portion of the tie being positioned between the interface switch contacts.

4. The signaling device of claim 1 wherein the nonconductive interrupter comprises a plastic tie.

5. The signaling device of claim 1 wherein the light source comprises an LED.

6. The signaling device of claim 1 further comprising a flashing timer electrically connected to the light source.

7. The signaling device of claim 1 further comprising a current limiting resistor electrically connected to the light source.

8. The signaling device of claim 1 wherein the vermin trap is tethered to the base.

9. The signaling device of claim 1 further comprising:
   an anchor affixed to the vermin trap; and
   a spring clip tethered to the base, the clip being reversibly connectable to the anchor.

10. The signaling device of claim 1 further comprising:
    a test switch electrically connected to the light source.

11. The signaling device of claim 10 further comprising:
    the test switch being electrically connected in parallel to the trap interface switch.

12. The signaling device of claim 10 wherein the test switch further comprises a spring biased, normally open switch.

13. The signaling device of claim 1 wherein the electrical power supply is affixed to the base.

14. The signaling device of claim 1 wherein the electrical power supply is remotely connected to the base.

15. A signaling device for use with a vermin trap having a bail, the device comprising:
    a base adapted to support the vermin trap;
    a trap interface switch affixed to the base, the trap interface switch having opposed contacts biased toward one another so that the trap interface switch is normally closed;
    a nonconductive interrupter adapted for secure attachment to the bail of the vermin trap, and being sized to fit between the opposed contacts to hold the trap interface switch in an electrically open position until the bail is closed, the bail withdrawing the interrupter from its position between the opposed contacts and permitting the switch to close when the bail is closed;
    a light source electrically connected in series to the trap interface switch;

a test switch electrically connected in series to the light source and in parallel to the trap interface switch, the test switch being normally open; and an electrical power supply electrically connected to the light source, to the test switch, and to the trap interface switch.

16. The signaling device of claim 15 wherein the closure of either the trap interface switch or the test switch energizes the light source.

17. A signaling device for use with a vermin trap having a bail, the bail being movable between an untripped position and a tripped position and being spring biased toward the tripped position, the device comprising:

a non-conductive interrupter having a proximal end and a distal end, the proximal end being attached to the bail at a position where the proximal end is moved so as to move the distal end when the bail moves as a result of the trap being actuated;

a trap interface switch mounted adjacent to the trap, the interface switch having opposed contacts biased toward one another so that the trap interface switch is normally closed, the trap interface switch being positioned such that the interrupter fits between the opposed contacts to hold the trap interface switch in an electrically open position when the bail is in its untripped position, the trap interface switch being further positioned such that interrupter is pulled out from between the opposed contacts and the trap interface switch moves to an electrically closed position when the bail moves from the untripped position to the tripped position;

a light source electrically connected to the trap interface switch;

a test switch electrically connected in series to the light source and in parallel to the trap interface switch, the test switch being normally open;

an electrical power supply electrically connected to the light source, to the test switch, and to the trap interface switch, such that when either the trap interface switch or the test switch is in an electrically closed position, a circuit between the light source and the power supply is electrically closed and the light source is actuated.

18. The signaling device of claim 17 wherein the test switch further comprises a spring-biased button, the button being arranged such that the application of force on the button moves the test switch to an electrically closed position.

19. The signaling device of claim 17 wherein the test switch and light source are electrically connected to the trap interface switch such that the test switch can be actuated and the light source observed at a remote location from the trap.

20. The signaling device of claim 17 wherein the test switch and signaling device are connected to the power supply and the trap interface switch by electrical cables.

* * * * *